United States Patent
Kametani et al.

[11] Patent Number: 5,923,188
[45] Date of Patent: *Jul. 13, 1999

[54] CLOCK SIGNAL DISTRIBUTION CIRCUIT OF TREE STRUCTURE WITH MINIMIZED SKEW

[75] Inventors: Jun Kametani; Yasushi Aoki, both of Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/662,006

[22] Filed: Jun. 12, 1996

[30]    Foreign Application Priority Data

Jun. 14, 1995  [JP]  Japan ................................. 7-147052

[51] Int. Cl.$^6$ ............................................. H03K 19/003
[52] U.S. Cl. ........................... 326/93; 326/101; 327/295; 327/297
[58] Field of Search ..................... 326/93, 101; 327/295, 327/294, 297, 293

[56]            References Cited

U.S. PATENT DOCUMENTS

| | | | |
|---|---|---|---|
| 5,109,168 | 4/1992 | Rusu ........................................ | 327/292 |
| 5,309,035 | 5/1994 | Watson, Jr. et al. ..................... | 327/261 |
| 5,317,601 | 5/1994 | Riordan et al. .......................... | 327/269 |
| 5,430,397 | 7/1995 | Itoh et al. ................................ | 326/101 |
| 5,497,109 | 3/1996 | Honda et al. ............................. | 326/93 |
| 5,519,351 | 5/1996 | Matsumoto ............................... | 327/295 |
| 5,656,963 | 8/1997 | Masleid et al. .......................... | 327/292 |
| 5,668,484 | 9/1997 | Nomura .................................... | 326/93 |
| 5,691,662 | 11/1997 | Soboleski et al. ...................... | 327/292 |

FOREIGN PATENT DOCUMENTS

| | | | |
|---|---|---|---|
| 4-290261 | 10/1992 | Japan ............................. | H01L 27/04 |
| 4-373160 | 12/1992 | Japan ............................. | H01L 27/04 |
| 5-218305 | 8/1993 | Japan ............................. | H01L 27/04 |

*Primary Examiner*—Timothy P. Callahan
*Assistant Examiner*—Terry L. Englund
*Attorney, Agent, or Firm*—Sughrue, Mion, Zinn, Macpeak & Seas, PLLC

[57]            ABSTRACT

Letting p be a definite integer, q be a varying integer from 1 to p, r be an arbitrary integer such that $1 \leq r \leq p$, and s be a varying integer from 2 to 2p+1, among a total of 2p+1 fan-like stages each having fan-out outputs thereof equalized to each other in load and number of associated fan-like stages, a respective 2q-th one comprises branch circuits each composed of one of a pair of logic gates, a 2r+1-th one comprises branch circuits each composed of a multi-input logic gate, a respective 2q−1-th one excepting the 2r+1-th one comprises branch circuits of which any one is composed of the other of the pair of logic gates, and a respective s-th one comprises branch circuits each respectively arranged within a cell layout region therefor and connected to an s+1-th stage at a vicinal location to a barycenter of the cell layout region to repeat a fan-out output of an s−1-th fan-like stage, as it is a clock signal distributed thereto.

6 Claims, 9 Drawing Sheets

CLOCK SIGNAL DISTRIBUTION CIRCUIT OF TREE STRUCTURE WITH MINIMIZED SKEW

BACKGROUND OF THE INVENTION

The present invention generally relates to a clock signal distribution circuit, and particularly, to a clock signal distribution circuit of a tree structure with a minimized skew between clock signals.

DESCRIPTION OF THE RELATED ART

The large-scale integrated circuit (hereafter "LSI") of a typical conventional design includes a clock signal distribution circuit, which is typically a single-phase synchronous circuit for a facilitated timing design.

FIG. 1 is a block diagram of an essential portion of a typical conventional single-phase synchronous circuit, and FIG. 2 is a timing chart of signals associated therewith.

The circuit portion of FIG. 1 includes a flip-flop (hereafter "FF") 8 arranged at a front stage and connected at a Q output node thereof to an input node of a combinational logic L and at a clock input node thereof to a driver 17 of a reference clock CLK of the single-phase synchronous circuit, a selector 10 for selecting one of a fed back data from the Q output node of the front-stage FF 8 and an output data from an unshown antecedent combinational logic to input the same to a D input node of the FF 8, another FF 9 arranged at a rear stage and connected at a Q output node thereof to an unshown subsequent stage and at a clock input node thereof to the driver 17 of the reference clock CLK, another selector 11 for selecting one of a fed back data from the Q output node of the rear-stage FF 9 and an output data from the combinational logic L to input the same to a D input node of the FF 9, and a pattern generation (hereafter "PG") circuit 7 for frequency-dividing and decoding the reference clock CLK from the driver 17 to generate an enable signal EN, by which the selectors 10 and 11 are concurrently operated for their data selection so that the front-stage and rear-stage FFs 8 and 9 are enabled to repeat the selected data, permitting a data transfer to be effected therebetween at a defined timing.

In the single-phase synchronous circuit, respective circuit actions to be synchronous have their timings based on the reference clock CLK. Therefore, a timing design of the circuit is relatively simple.

In such a synchronous circuit, however, each FF (e.g. 8 or 9) repeats a clock signal CLK at a timing which is different from the timing where it latches a data, so that a clock driver in the FF constantly consumes power.

Additionally, the respective FFs (such as 8 and 9) need their antecedent selectors (such as 10 and 11), resulting in an increased scale of gates in proportion to a total number of the FFs.

To overcome such drawbacks there have been proposed synchronous circuits using a gated clock in place of a reference clock.

FIG. 3 is a block diagram of an essential portion of a conventional synchronous circuit using a gated clock dedicated for a respective FF, and FIG. 4 is a timing chart of signals associated therewith. Like members are designated by like reference characters.

In the circuit portion of FIG. 3, there is employed an OR gate 12 or 13 in place of a selector (e.g., 10 or 11 in FIG. 1) for an FF 8 or 9, respectively.

More specifically, the input nodes of OR gates 12 and 13 are connected to an output node of a driver 17 of a reference clock CLK and an enable signal output node of a PG circuit 7, and the output nodes of OR gates 12 and 13 are connected to a clock input node of the FF 8 and 9, respectively. FF 8 is connected at a D input node thereof to an output node of an unshown antecedent combinational logic and at a Q output node thereof to an input node of a combinational logic L. FF 9 is connected at a D input node thereof to an output node of the combinational logic L and at a Q output node thereof to a subsequent stage, so that the circuit of FIG. 3 is equivalent to that of FIG. 1.

FIG. 5 is a block diagram of an essential portion of a conventional synchronous circuit using a gated clock common to respective FFs. Like members are designated by like reference characters.

The circuit portion of FIG. 5 simply employs, in place of dedicated OR gates (such as 12 and 13 of FIG. 3), an OR gate 12 commonly connected at an output node thereof to respective clock input nodes of FFs 8 and 9, permitting data latching actions of the FFs 8 and 9 to be concurrently performed.

In the circuit of FIG. 5, a gated clock to be input to the respective FFs 8 and 9 is masked with an enable signal EN output from the PG circuit 7, so that power is consumed in the FFs 8 and 9 only when they latch data.

Accordingly, a reference clock driver 17 in the circuit of FIG. 5 has a reduced load, in comparison with the circuit of FIG. 3 in which the driver 17 serves as a concentrated buffer for distributing the reference clock CLK to the respective FFs 8 and 9. A total power consumption is thus effectively reduced.

However, the conventional synchronous circuits shown in FIGS. 3 and 5 do provide for an equality among a number of buffers for driving clock signals to be distributed to a group of FFs, thus resulting in undesirable skews between clocks repeated by the FFs.

In recent years, device processing techniques have been developed which enable LSIs to be fabricated with gate lengths of a submicron order, achieve a high integration with increases of relative circuit areas relative to an available chip area, and provide for miniaturization of aluminum wiring, thereby causing increased wiring delays, and rendering skews undesirable, particularly in the case of a large-scaled integration.

A resultant need for a timing design in consideration of a clock skew has accompanied problems such as a provision of an extra delay gate for a data bus to compensate hold margins at FFs, and an increased tendency to repeat redesigning a circuit layout on a chip.

To this point, there have been proposed a number of improved clock signal distribution circuits.

One is a clock signal distribution circuit disclosed by Japanese Patent Application Laid-Open Publication No. 5218305. in which a clock amplifying gate has an used pin thereof extended with a wiring pattern equivalent in length to a wiring pattern of an unused pin.

Another is a tree-configured clock signal distribution circuit disclosed by Japanese Patent Application Laid-Open Publication No. 4-373160, in which respective tree stages have an identical wiring length.

Still another is a clock signal distribution circuit disclosed by Japanese Patent Application Laid-Open Publication No. 4-290261, which has buffer means located in dependence on an average value of x-coordinates of load means and that of y-coordinates thereof.

These conventional clock signal distribution circuits ensure an equality between loads of clock signal buffers to reduce a skew between clock signals.

However, such circuits have no considerations provided for a reduction-of power consumption at FFs.

The present invention has been achieved with such points in mind.

SUMMARY OF THE INVENTION

It therefore is an object of the present invention to provide a clock signal distribution circuit, for an LSI to have stable synchronous timing actions, permitting a control circuit thereof to be simplified, saving electric power.

To achieve the object, a genus of the invention provides a clock signal, distribution circuit comprising a tree structure for distributing a clock signal in an LSI, wherein the tree structure comprises a total of 2p+1 fan-like stages in which a respective stage has a corresponding number of fan-out outputs thereof equalized to each other in load and number of associated fan-like stages, where p is a definite integer, a respective 2q-th stage of the 2p+1 fan-like stages comprises a plurality of branch circuits of which a respective branch circuit comprises one of a pair of logic gates, where q is a varying integer between 1 and p, both inclusive, a 2r+1-th one of the 2p+1 fan-like stages comprises a plurality of branch circuits of which a respective branch circuit comprises a multi-input logic gate, where r is an arbitrary integer between 1 and p, both inclusive, a respective 2q−1-th stage excepting the 2r+1-th one of the 2p+1 fan-like stages comprises a plurality of branch circuits of which an arbitrary branch circuit comprises the other of the pair of logic gates, and a respective s-th stage of the 2p+1 fan-like stages comprises a corresponding number of branch circuits each respectively arranged within a cell layout region therefor and connected to an s+1-th stage of the 2p+1 fan-like stages at a location vicinal to a geometrical center of the cell layout region to repeat one of the corresponding number of fan-out outputs of an s−1-th stage of the 2p+1 fan-like stages, as it is the clock signal distributed thereto, where s is a varying integer between 2 and 2p+1, both inclusive.

According to the genus of the invention, a respective one of fan-out outputs as clock signals distributed through a tree-descending route from a top stage has a relatively small skew so that the clock signals are substantially identical to each other with respect to a timing for synchronization, thus permitting a control circuit thereof to be simplified, saving electric power.

According to a species of the genus of the invention, the multi-input logic gate has at least two input terminals either for receiving the clock signal, as it is distributed thereto, and the other for receiving a latch enable signal so that the multi-input logic gate outputs the clock signal in a controlled manner by the latch enable signal.

According to another species of the genus of the invention, the location of interconnection between the corresponding number of branch circuits of the respective s-th fan-like stage is determined so that the corresponding number of branch circuits have wiring lengths thereof substantially identical to each other in terms of a distance defined in relation to an area of a corresponding region on a chip of the LSI and a layout position therein.

According to an individual of this species of the invention, the wiring lengths are each respectively set in terms of a Manhattan distance.

According to another species of the genus of the invention, the pair of logic gates comprise a pair of inverter buffer amplifiers identical of drivability, and the multi-input logic gate comprises a two-input OR gate, as r=p.

BRIEF DESCRIPTION OF THE DRAWINGS

The objects, features and advantages of the present invention will become more apparent from consideration of the following detailed description, in conjunction with the accompanying drawings, in which.

DESCRIPTION OF THE PREFERRED EMBODIMENTS

There will be detailed below the preferred embodiments of the present invention, with reference to FIGS. 6 and 7.

Figure 6:
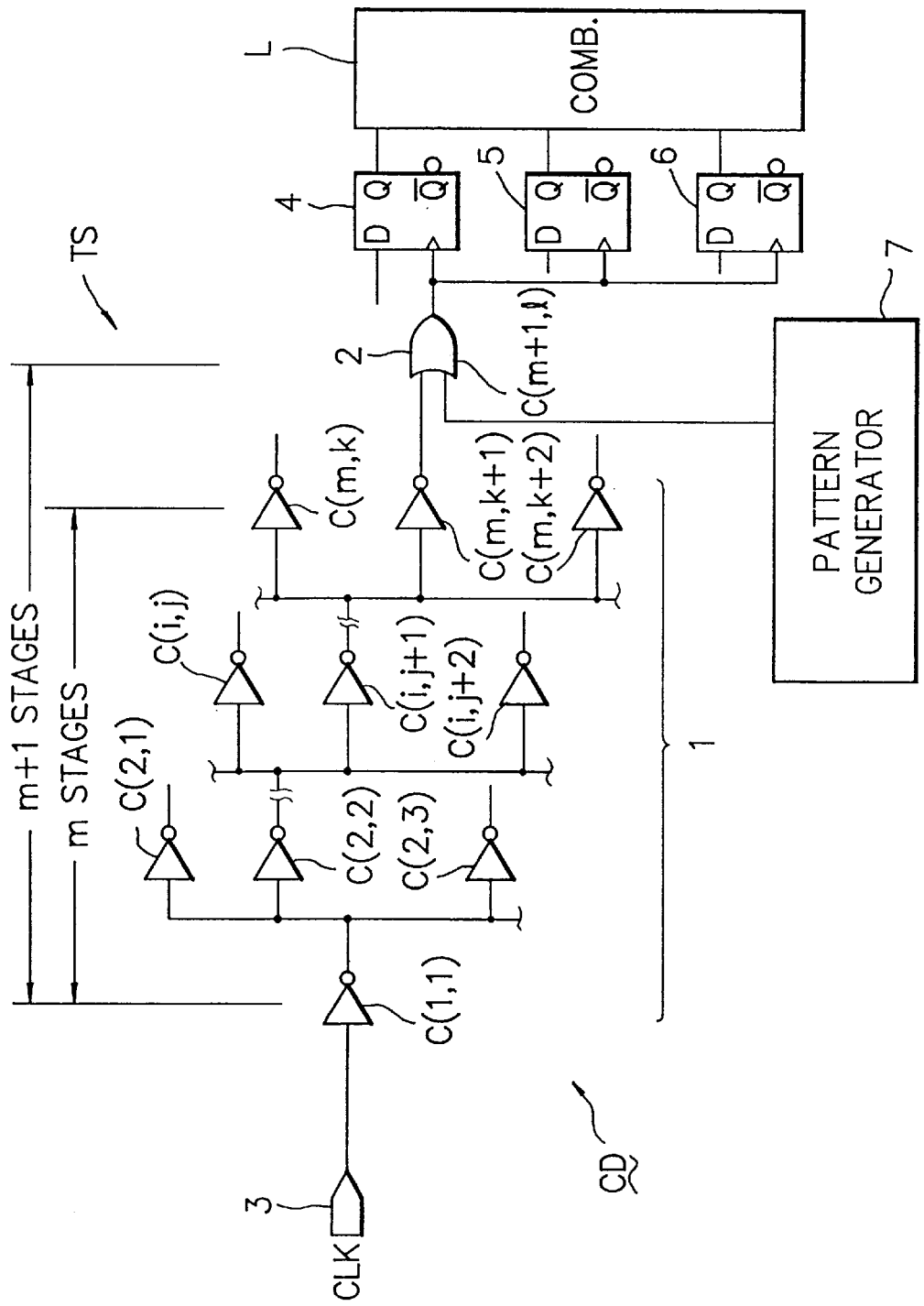
FIG. 6 is a circuit diagram of a clock distribution circuit according to an embodiment of the invention.
Figure 7:
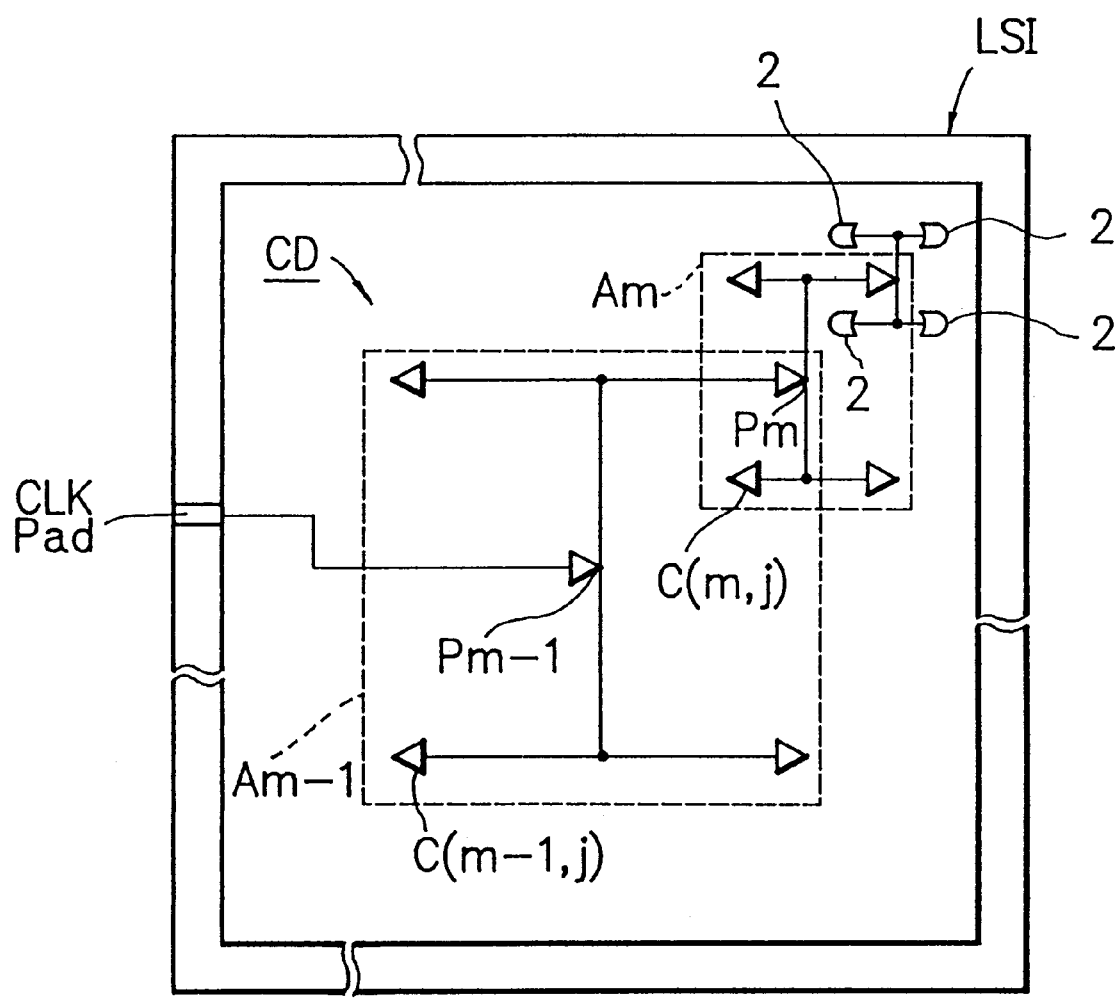
FIG. 7 is a schematic layout plan of buffers of the clock distribution circuit of FIG. 6.

FIG. 6 shows a clock distribution circuit for an LSI formed on a chip according to an embodiment of the invention, and FIG. 7 shows a schematic layout of buffers of the clock distribution circuit of FIG. 6. Like members are designated at like reference characters.

In FIG. 6, designated at a reference character CD is an entirety of the clock signal distribution circuit according to the embodiment, and CLK is a reference clock repeated by a clock repeater 3 of the LSI.

The clock signal distribution circuit CD comprises a pattern generator 7, and a multi-staged tree structure TS of clock signal repeating cells $C(i,j)$ for distributing the reference clock CLK to clocking terminals of a total of N (a predetermined integer) sequential circuit members such as FFs 4 to 6, latches and counters. "i" is an arbitrary integer representative of an identification number of an i-th identified one of a total of m+1 stages of the tree structure TS, as it is counted in a tree-descending order where m=2p and p is a definite positive integer. "j" is an arbitrary integer representative of an identification number of a j-th identified one of a total of $J_i$ cells of an i-th stage, as it is counted in an arranged order.

The circuit members are connected at their input ends to (an) unshown antecedent combinational logic(s) and at their output ends to (a) combinational logic(s) L.

Letting {} be a set of cells and m=2p, the tree structure TS comprises a total of 2p+1 (m+1) fan-like stages $\{C(i,j)\}$ wherein each respective stage has a corresponding number of fan-out outputs equalized to each other in load and number of associated fan-like stages, as the outputs are distributed clocks. Since p is an integer, 2p+1 designates that the total number of stages is limited to an odd number.

In other words, the tree structure TS comprises a basic structure 1 having a total of first m stages {c(i,j); i=1 to m}, and a final fan-out structure as an m+1-th stage {C(m+1,l)}.

It will be seen that the integer m depends on the total number N of sequential circuit members, to achieve an equal load layout of cells meeting a fan-out rule.

Let q be a varying integer between 1 and p, inclusive, such that stage 2q designates an even number stage within the tree's structure and stage 2q−1 designates an odd number stage, and let r be an arbitrary integer between 1 and p, inclusive, such that stage 2r+1 designates any odd number stage except for the first stage within the tree structure. The tree structure TS is constituted such that: (1) stage 2q {C(2q,j)} of the 2p+1 stages comprises a plurality of branch circuits wherein a respective branch circuit comprises one C(2q,j), of a pair of logic gates as cells C(2q,j) and C(2q−1,j), e.g. a pair of inverters as a combination of an unshown cell C(m−1,j) in an m−1-th stage and a cell C(m,k) (k=an arbitrary positive integer) in an m-th stage of FIG. 6; (2) stage 2r+1-th {C(2r+1,i)} of the 2p+1 stages comprises a plurality of branch circuits wherein a respective branch circuit comprises a multi-input logic gate, e.g. a two-input OR gate 2 as a cell C(m+1, l) (l=an arbitrary positive integer) in the final stage of FIG. 6; and (3) respective stage 2q−1 {C(2q−1,j)} except for the 2r+1-th stage of the 2p+1 stages comprises a plurality of branch circuits of which an arbitrary branch circuit comprises the other C(2q−1,j) of the pair of logic gates C(2q,j) and C(2q−1,j).

In place of stage 2q−1 stage, a respective 2q+1-th stage {C(2q+1,i)} of the 2p+1 stages, except for stage 2r+1, may comprise a plurality of branch circuits including as an arbitrary branch circuit thereof the other of the paired logic gates.

In the embodiment, the paired logic gates C(2q,j) and C(2q−1,j) comprise a combination of two-staged inverters as clock repeating buffers equivalent to each other in drivability and transmission characteristics, in order to minimize a degradation of clock duty due to a difference between a rise time tr and a fall time t, of buffer in the basic structure 1, thereby achieving an improved skew.

It will be seen that the respective 2q-th stage of the basic structure 1 has a total number of cells {C(2q,j)} thereof larger than that of cells {C(2q−1,j)} of the 2q−1-th stage.

Accordingly, the equivalency between the paired cells C(2q,j) and C(2q−1,j) refers to a corresponding equivalency between an arbitrary cell in a lower stage of a pair of neighboring stages and an arbitrary cell in an upper stage of the pair of stages, as well as to that between an arbitrary pair of cells in the lower stage and between an arbitrary pair of cells in the upper stage.

Moreover, in the embodiment, the final m+1 stage comprises a total of N branches each respectively composed of an n-input logic gate, where n is a positive integer larger than unity, to constitute an equal stage, equal load clock distribution tree of m+1 stages, ensuring a better skew.

More specifically, each of the N branches comprises the 2-input OR gate 2 of which one input terminal repeats a clock signal distributed from the m-th stage and the other input terminal repeats a latch enable signal from the pattern generator 7 so that the 2-input OR gate 2 outputs a logic signal in a controlled manner by the latch enable signal.

Figure 1:
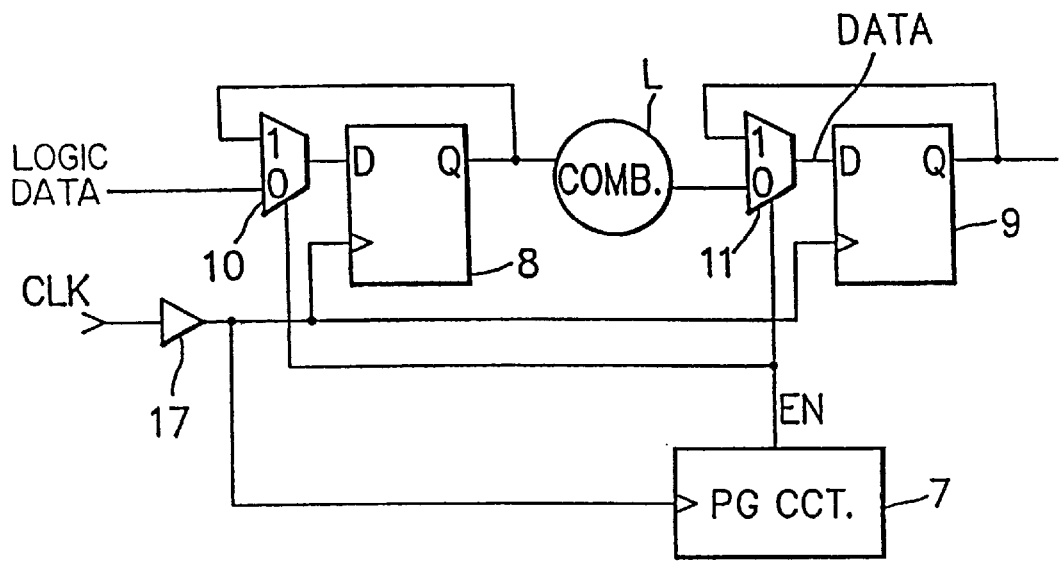
FIG. 1 is a block diagram of an essential portion of a typical conventional single-phase synchronous circuit.
Figure 2:
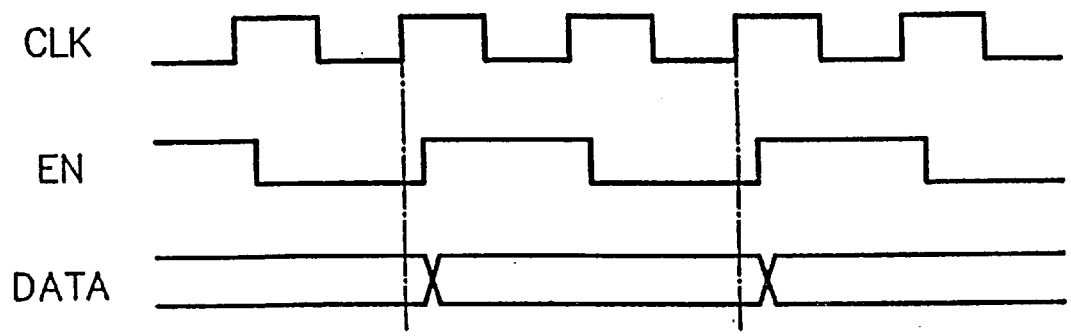
FIG. 2 is a timing chart of signals associated with the circuit portion of FIG. 1.
Figure 3:
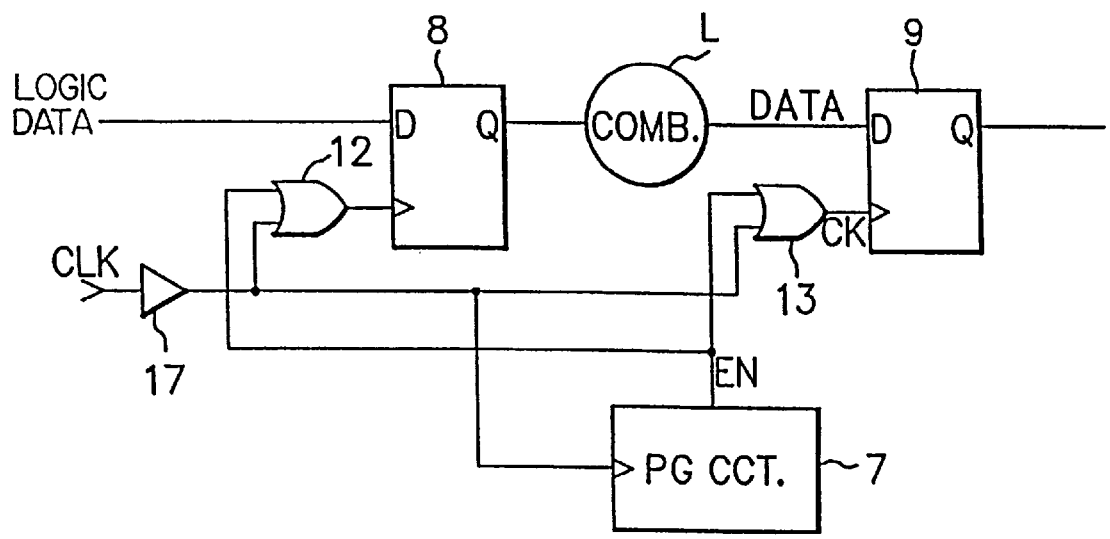
FIG. 3 is a block diagram of an essential portion of a conventional synchronous circuit using a gated clock dedicated for a respective FF.
Figure 4:
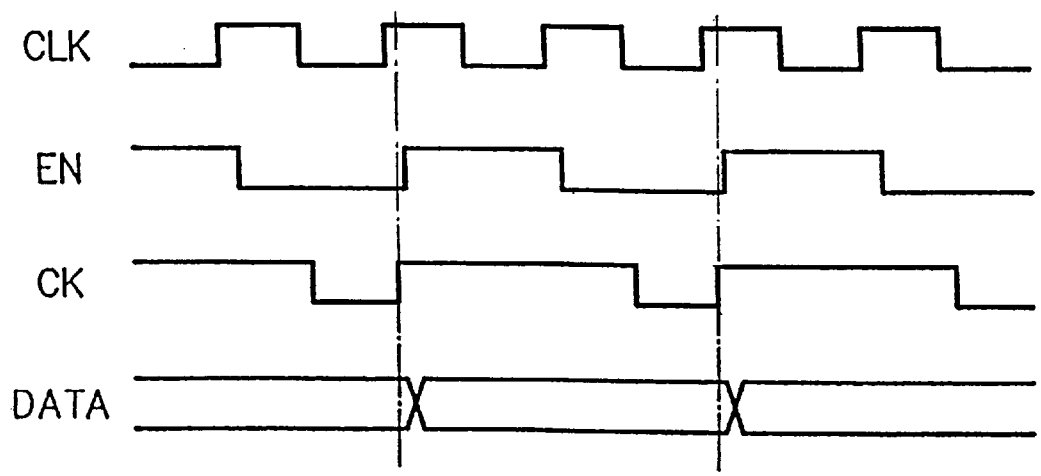
FIG. 4 is a timing chart of signals associated with the circuit portion of FIG. 3.
Figure 5:
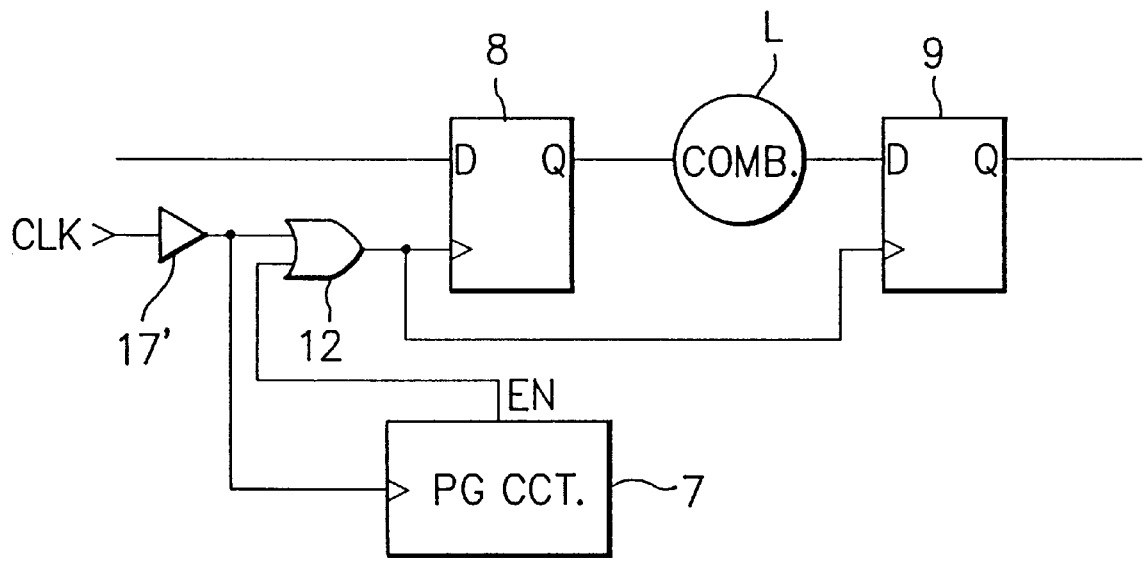
FIG. 5 is a block diagram of an essential portion of a conventional synchronous circuit using a gated clock common to pertinent FFs.

According to the embodiment described thereto, one can obtain a similar performance to that shown in FIG. 4.

The tree structure TS including the basic structure 1 ensures a compensation for an equalized load to a gate delay of clock buffer.

Further, as shown in FIG. 7, the clock signal distribution circuit CD is improved in circuit layout design for reducing a tendency of having a skew developed by a wiring delay due to associated wiring capacitances, to thereby minimize a clock skew.

In other words, the tree structure TS is improved for a better skew so that, letting s be a varying integer between 2 and 2p+1, inclusive (where "s" is a variable number which is defined independent to the above "2q", "2q−1", and is used for explaining respective stages under the relation of layout position), a respective s-th stage {C(s,j)} of the 2p+1 fan-like stages comprises a corresponding number of branch circuits each respectively arranged within a subdivided cell layout region as therefor (e.g. a region Am for one cell in the m−1-th stage that is connected to a corresponding group of cells in the m-th stage in FIG. 7) and connected at a location Ps (e.g. a location Pm in the region Am) vicinal to a geometrical center of the sub-divided cell layout region As to repeat one of the corresponding number of fan-out outputs of an s−1-th one of the 2p+1 fan-like stages, as it is the clock signal distributed thereto.

The tree structure of the present invention will be described with reference to FIG. 8 wherein p=2 so that the tree structure has a total of five stages (2p+1).

Figure 8:
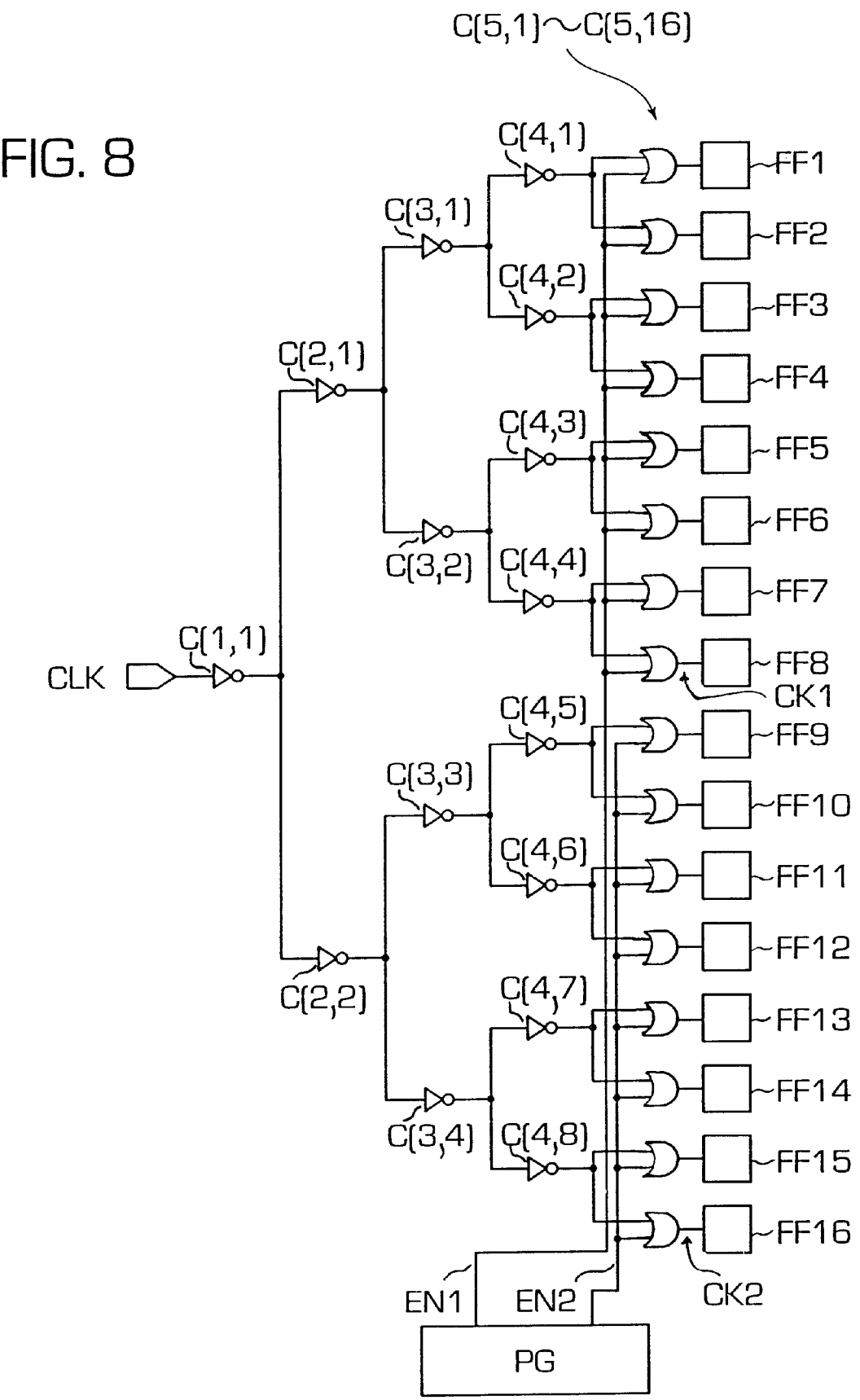
FIG. 8 is a circuit diagram of a clock distribution circuit having five stages according to an embodiment of the present invention.

In FIG. 8, "2q" designates the second stage {C(2, 1), (2, 2)} and the fourth stage {C(4, 1)~C(4, 8)}. Further "2q−1" designates the first stage {C(1, 1)} and the third stage {C(3, 1)~C(3, 4)} ("2r+1" is eliminated from the definition of "2q−1"). In this example, r equals 2 of "2r+1". Although, when r equals 1, a stage constituted by a 2-input OR becomes a third stage, it is capable of being constituted by a tree structure logically equivalent to the present embodiment.

Figure 9:
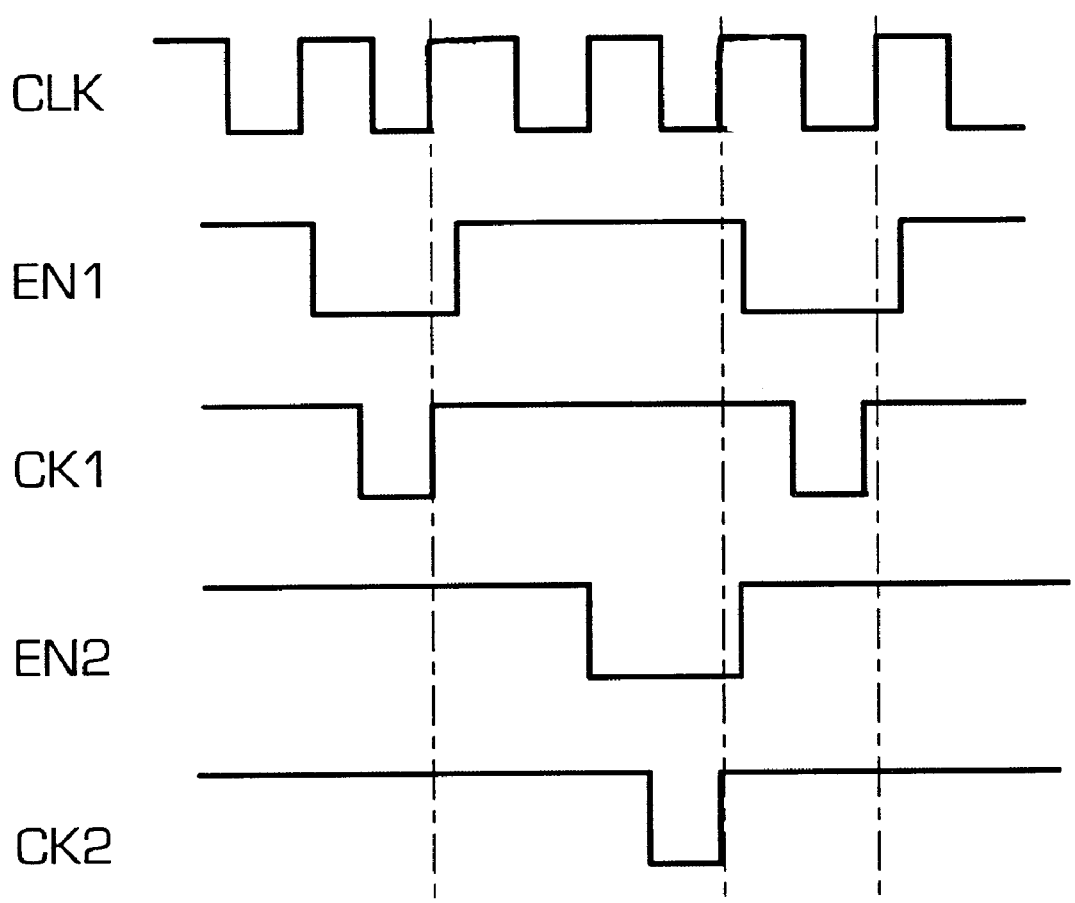
FIG. 9 is a timing diagram of signals associated with circuit of FIG. 8.

In the fifth stage {C(5,1)~C(5,16)} of FIG. 8, another input of 2-input OR of C(5, 1)~C(5, 8) is connected to EN1, and (5, 9)~C(5, 16) is connected to EN2. This means that latch timing of the data is capable of setting independently of the FF which provides clock. In this embodiment, the group of FF1–FF8 is controlled by EN1, and the group of FF9–FF16 is controlled by EN2. FIG. 9 is a timing chart showing this timing.

In the present invention, since the number of EN signals which control each FF is not restricted, each FF supplied with the clock signal in this tree structure is capable of being controlled by providing EN respectively.

Next, the method of determining the variable "p" which determines tree structure of the present invention will be described. Since it is an object of the tree structure to distribute the clock to sequential circuits (FF, Latch, Counter, etc.) within the LSI, the total number of these sequential circuits is determinative of the variable "p" which causes a logic gate used as "a pair of logic gates". The number "p" is less than half of the fan-out number of this logic gate, and which becomes power of 2 (2, 4, 8, 16, . . . ) is determined. Since this number is defined as a number of "branch circuits" diverging from logic gate C(i, j) of respective stages, the value of the power which becomes more than total number of sequential circuits is determined. When the value of the power is an even number, "p" is determined so that the value of the power is divided by 2, while when the value of power is an odd number, "p" is determined so that the value of power is added by 1 and then divided by 2.

As shown in FIG. 8, when the total number of the sequential circuits is 16, (causing inverter to be used for the logic gate, and fan-out number to be 5), the number of "branch circuits" becomes 2. Accordingly, since 2 to the 4th power equals 16, p=2 is determined.

Further, in the above described method, when the total number of the sequential circuit differs from the power number of 2 which is more than the total number, the output number of each logic gate (C(m+1, l) of FIG. 6 of the specification) of the last stage "2p+1-th" is adjusted to be equalized as much as possible.

Next, in both the even numbered stage "2q" and the odd numbered stage "2q−1", necessity for using a pair of logic gates will be explained. When there is paid attention to the first stage of {C(1, 1)} and the second stage of {C(2, 1), C(2, 2)}, the logic gate of the respective stages uses an inverter. Here the first stage of {C(1, 1)} is used as the inverter, causing the second stage of {C(2, 1), C(2, 2)} to change into 2-input NAND (FIG. 10A).

Figure 10A:
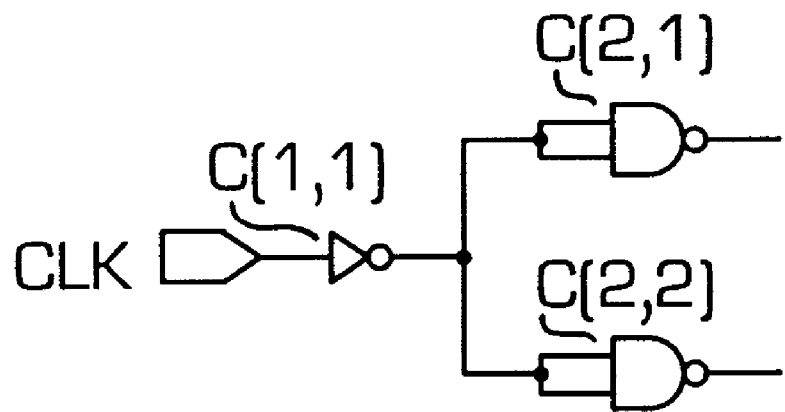
FIGS. 10A and 10B are circuit diagrams of a portion of the circuit of FIG. 6.

In FIG. 10A, although the clock signal which is shared is transferred with the same phase as original CLK, deterioration of duty or the like is generated after passing the second stage based on difference of propagation property between the inverter and the 2-input NAND. This deterioration is not desirable for the clock allocation circuit.

Figure 10B:
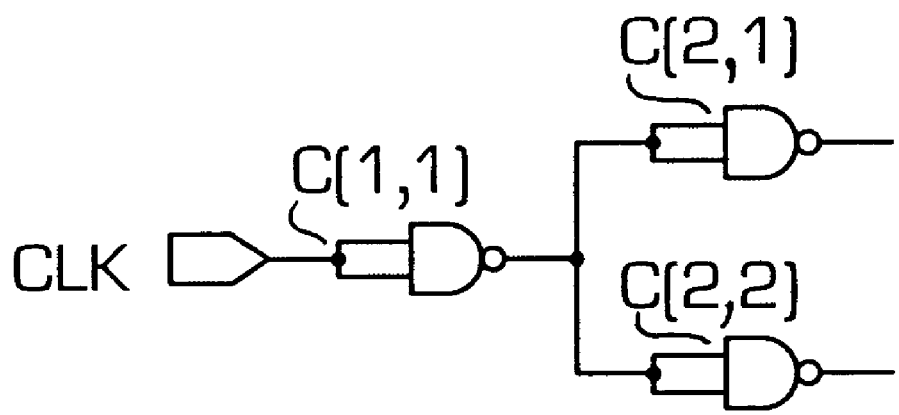

In contrast thereto, in the configuration of FIG. 10B, deterioration of duty is capable of being guaranteed due to the fact that it causes logic gate of the first and the second stages to make the same 2-input NAND. Consequently, "one of a pair of logic gates" of the "2q-th" stage is related to "the other of the pair of logic gates".

Figure 11:
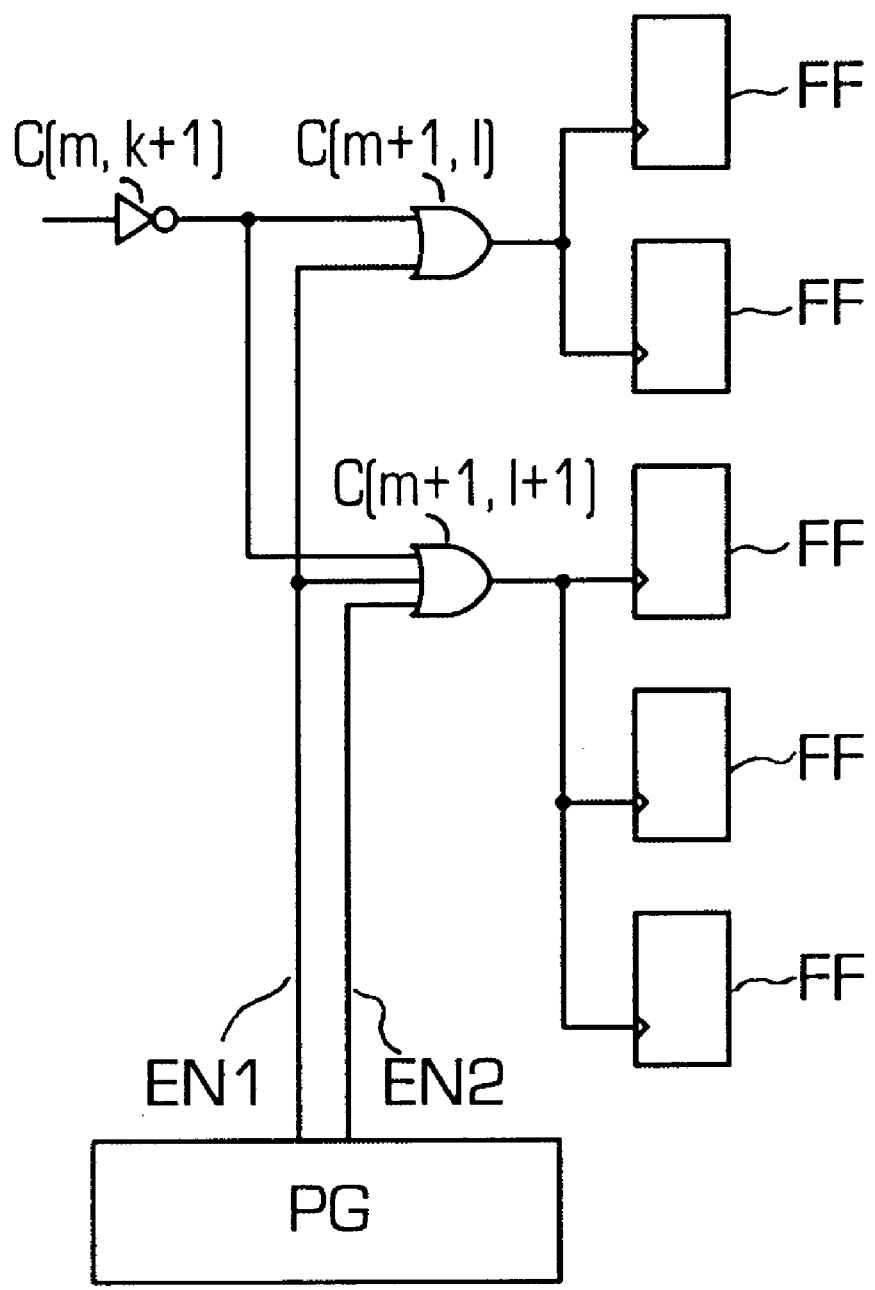
FIG. 11 is a circuit diagram of an embodiment of the present invention.

In FIG. 11, {C(m+1, l), C(m+1, l+1)} denotes the cell of the stage 2r+1, where 2-input OR gate is used for C(m+1, l), and 3-input OR gate is used for C(m+1, l+1). This causes the clock signal from higher rank stage to be provided to one input of the "Multi-input logic gate", while it causes the enable signal from the "PG" to be provided to the other input. Namely, when the FF operates with complicated timing, the "Multi-input logic gate" is used so as to be realized with combination of a plurality of enable signals from "PG". Since, it is a matter of course that the combination of the plurality of enable signals are realized on the inside of "PG", the representative example of the "Multi-input logic gate" becomes the "2-input logic gate" (OR, AND, NOR, etc.).

In the layout design, there are employed a number of associated dimensions of the LSI such as relative distances to a clock pad in terms of a so-called Manhattan distance (townroad distance) to determine the geometrical center of the first stage, as the clock tree descends therefrom.

For this purpose, first, a total area to be occupied by the cells {C(i,j)} of the tree structure TS is determined in dependence on a scale of the circuit, so that a cell layout region is defined on a floor plan of the LSI chip.

Second, a geometrical center position of the cell layout region is determined on the basis of distances (e.g. Manhattan distances) from a periphery of this region.

Third, the geometrical center position has a cell C(1, 1) of the first stage disposed thereon or in a vicinity thereof.

Fourth, the cell layout region is divided by a number of division lines crossing on the geometrical center position for an H-tree stage, e.g. into four regions.

Incidentally, for the respective s-th stage, such the number of division lines as well as a layout thereof depends on a driving capacity of an antecedent cell. The number of division lines may preferably be a power of 2 for a facilitated division.

Accordingly, a respective one of divided regions of the cell layout region for the first stage constitutes an entirety of each cell layout region for a cell tree that descends from a corresponding one of a total number of cells in a second stage.

Then, like the case of the first stage, a geometrical center is determined for the respective divided region to place thereon the corresponding cell of the second stage.

For a tree-descending route from the cell C(1,1) of the first stage to an arbitrary cell C(m+1,j) of the final stage, like arrangement is repeated a total of m+1 times to place the last cell C(m+1,j) at a position vicinal to a geometrical center of a very small local region.

Upon a completion of clock tree layout, the N sequential circuit members have their layout positions determined in order so that respective FFs to be controlled with a latch enable signal are disposed near multi-input logic gates and, among such the FFs, those (e.g. FFs—4 to 6) to be clocked with a clock signal distributed from a multi-input logic gate (e.g. 2-input OR gate 2 as the cell C(m+1, l)) are disposed in a vicinity of the logic gate.

Thereafter, wirings such as conductors are installed for necessary interconnections between the cells {C(i,j)} in the tree structure TS, as well as for necessary connections between the tree structure TS and the N sequential circuit members, permitting clock signals to be distributed to FFs with a very small skew not exceeding, for example, 1 ns.

According to the embodiment, a tree structure TS of clock-repeating cells is constituted with an m-staged gate-pairing basic clock tree and a final fan-like stage of n-input logic gates for a compensation to ensure an equi-stage equiload clock distribution, permitting a remarkable reduction in scale of gate circuitry of a clock signal distribution circuit in comparison with a conventional single-phase synchronous circuit.

Moreover, Power consumption at each FF takes place merely when a data is written to the FF, permitting electric power to be effectively saved in an LSI.

As will be understood from the foregoing description, a respective one of fan-out outputs as clock signals distributed through a tree-descending route from a top stage has a relatively small skew so that the clock signals are substantially identical to each other with respect to a timing for synchronization, thus permitting a control circuit thereof to be simplified, saving electric power.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A clock signal distribution circuit comprising a tree structure for distributing a clock signal in an LSI, wherein:

the tree structure comprises a total of 2p+1 fanlike stages of which a respective stage has a corresponding number of fan-out outputs thereof equalized to each other in load and number of associated fan-like stages, where p is an integer greater than zero and 2p+1 is an odd numbered integer;

a respective 2q-th stage of the 2p+1 fan-like stages comprises a plurality of branch circuits of which a respective branch circuit comprises one of a pair of logic gates, where q is a varying integer between 1 and p, inclusive, and 2q denotes an even numbered stage of the 2p+1 fan-like stages and 2q−1 denotes an odd numbered stage;

a 2r+1-th stage of the 2p+1 fan-like stages, except for a last stage, comprises a plurality of branch circuits of which a respective branch circuit comprises a multi-input logic gate, where r is an integer between 1 and p, inclusive, and 2r+1 denotes an odd numbered stage of the 2p+1 fan-like stages;

a respective 2q−1-th stage of the 2p+1 fan-like stages, except for the 2r+1-th stage, comprises a plurality of branch circuits, one of which comprises the other of the pair of logic gates; and a respective s-th stage of the 2p+1 fan-like stages comprises a corresponding number of branch circuits each respectively arranged within a cell layout region therefor and connected to an s+1-th stage of the 2p+1 fan-like stages at a location near to a geometrical center of the cell layout region to repeat one of the corresponding number of fan-out outputs of an s−1-th stage of the 2p+1 fan-like stages, the clock signal being distributed thereto, where s is a varying integer between 2 and 2p+1, inclusive.

2. A clock signal distribution circuit according to claim 1, wherein the multi-input logic gate has two input terminals, one terminal for receiving the clock signal as it is distributed thereto, and the other terminal for receiving a latch enable signal so that the multi-input logic gate outputs the clock signal in a controlled manner by the latch enable signal.

3. A clock signal distribution circuit according to claim 1, wherein the location of interconnection between the corresponding number of branch circuits of the respective s-th fan-like stage is determined so that the corresponding number of branch circuits have wiring lengths thereof substantially identical to each other in terms of a distance defined in relation to an area of a corresponding region on a chip of the LSI and a layout position therein.

4. A clock signal distribution circuit according to claim 3, wherein the wiring lengths are each respectively set in terms of a Manhattan distance.

5. A clock signal distribution circuit according to claim 1, wherein:

the pair of logic gates comprise a pair of inverter buffer amplifiers identical of drivability; and the multi-input logic gate comprises a two-input OR gate, as r=p.

6. A clock signal distribution circuit comprising a tree structure for distributing a clock signal in an LSI, the tree structure comprising:

an odd number of total fan-like stages, each having a corresponding number of fan-out outputs equalized to each other in load and number of associated fan-like stages, wherein a single odd-numbered fan-like stage selected from the total fan-like stages, except for a first stage and a last stage, comprises a plurality of branch circuits each of which comprises a plurality of logic gates having one input connected to a clock signal from a preceding stage and another input connected to an enable signal;

the total fan-like stages are divided into a first group including stages ranging from the first stage to a stage immediately before said selected odd-numbered fan-like stage, and a second group including stages ranging from a stage following immediately after said selected odd-numbered fan-like stage to a final stage;

a pair of logic gates, having the same electrical characteristics, are used as a clock signal buffer of the odd and even numbered stages in the first group of stages and the second group of stages;

when the selected odd-numbered fan-like stage is a final stage of the total fan-like stages, all of the other stages of the total fan-like stages comprise the first group of stages only; and each of the total fan-like stages comprises branch circuits, each of which is arranged within a cell layout region to which a clock signal is distributed, connected to subsequent stages at a location near to a geometrical center of the cell layout region to which the subsequent stages distribute the clock signals.

* * * * *